(12) United States Patent
Kitano

(10) Patent No.: US 11,383,558 B2
(45) Date of Patent: Jul. 12, 2022

(54) TYRE

(71) Applicant: Sumitomo Rubber Industries, Ltd., Kobe (JP)

(72) Inventor: Tetsuya Kitano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 492 days.

(21) Appl. No.: 16/364,529

(22) Filed: Mar. 26, 2019

(65) Prior Publication Data

US 2019/0308468 A1  Oct. 10, 2019

(30) Foreign Application Priority Data

Apr. 10, 2018 (JP) .............................. JP2018-075600

(51) Int. Cl.
  *B60C 11/13* (2006.01)
  *B60C 11/03* (2006.01)

(52) U.S. Cl.
  CPC .......... *B60C 11/13* (2013.01); *B60C 11/0304* (2013.01); *B60C 11/0306* (2013.01); *B60C 2011/036* (2013.01); *B60C 2011/0341* (2013.01); *B60C 2011/0362* (2013.01); *B60C 2011/0365* (2013.01); *B60C 2011/0367* (2013.01); *B60C 2011/0372* (2013.01)

(58) Field of Classification Search
  CPC ... B60C 11/0304; B60C 11/04; B60C 11/042; B60C 2011/0337; B60C 2011/0358; B60C 2011/0372; B60C 2011/0374; B60C 2011/0386; B60C 2011/0388; B60C 2011/036; B60C 2011/0365

USPC ...................................................... 152/209.8

See application file for complete search history.

(56) References Cited

U.S. PATENT DOCUMENTS

| | | | |
|---|---|---|---|
| 3,749,145 A | 7/1973 | Hart et al. | |
| 5,394,915 A * | 3/1995 | Takada | B60C 3/04 152/209.1 |

(Continued)

FOREIGN PATENT DOCUMENTS

| | | |
|---|---|---|
| EP | 2738019 A1 | 6/2014 |
| FR | 2095240 A1 | 2/1972 |

(Continued)

OTHER PUBLICATIONS

Extended European Search Report, dated Aug. 13, 2019, for European Application No. 19162781.9.

*Primary Examiner* — Robert C Dye
*Assistant Examiner* — Edgaredmanuel Troche
(74) *Attorney, Agent, or Firm* — Birch, Stewart, Kolasch & Birch, LLP

(57) ABSTRACT

A tyre has a tread portion provided with a rib. The rib is provided with a lateral groove extending so as to completely cross the rib. The lateral groove includes a first curved portion and a second curved portion. The first curved portion extends from a first end in a curved shape convex in a first direction in a tyre circumferential direction. The second curved portion extends from the second end in a curved shape convex in a second direction in the tyre circumferential direction. A groove width of the first curved portion is gradually increased over the entire length thereof as it goes toward the first end, or a groove width of the second curved portion is gradually increased over the entire length thereof as it goes toward the second end.

19 Claims, 5 Drawing Sheets

(56) References Cited

U.S. PATENT DOCUMENTS

| | | | |
|---|---|---|---|
| 5,407,005 A | | 4/1995 | Consolacion et al. |
| D643,804 S | * | 8/2011 | Dixon .......................... D12/594 |
| 2003/0056867 A1 | * | 3/2003 | Bettiol ................ B60C 11/1369 152/209.18 |
| 2007/0151645 A1 | * | 7/2007 | Mathews .............. B60C 11/047 152/209.18 |
| 2007/0151646 A1 | | 7/2007 | Ito |
| 2010/0200138 A1 | * | 8/2010 | Shibano .............. B60C 11/0306 152/209.25 |
| 2010/0294409 A1 | * | 11/2010 | Bolzoni .............. B60C 11/1263 152/209.18 |
| 2017/0120688 A1 | | 5/2017 | Murata |
| 2017/0253090 A1 | * | 9/2017 | Wakizono ........... B60C 11/0306 |

FOREIGN PATENT DOCUMENTS

| | | | | |
|---|---|---|---|---|
| JP | 08072508 A | * | 3/1996 | ............. B60C 11/13 |
| JP | 2007-182097 A | | 7/2007 | |
| WO | WO 01/00427 A2 | | 1/2001 | |

\* cited by examiner

TYRE

TECHNICAL FIELD

The present invention relates to a tyre for a vehicle.

BACKGROUND ART

Unexamined Japanese Patent Application Publication No. 2007-182097 (Patent Literature 1) has disclosed a tyre having a tread portion having a rib provided with concave portions crossing the rib.

SUMMARY OF THE INVENTION

However, with respect to the concave portions described above, the Patent Literature 1 was not intended to improve noise performance, wet performance, and uneven wear resistance performance.

The present invention was made in view of the above, and a primary object thereof is to provide a tyre capable of improving the noise performance, the wet performance, and the uneven wear resistance performance.

In one aspect of the present invention, a tyre comprises a tread portion, wherein the tread portion is provided with a rib divided by at least one main groove extending continuously in a tyre circumferential direction, the rib is provided with a lateral groove extending between a first end and a second end thereof so as to completely cross the rib, the lateral groove includes a first curved portion and a second curved portion, the first curved portion extends from the first end in a curved shape convex in a first direction in the tyre circumferential direction, the second curved portion extends from the second end in a curved shape convex in a second direction in the tyre circumferential direction, and a groove width of the first curved portion is gradually increased over an entire length thereof as it goes toward the first end, or a groove width of the second curved portion is gradually increased over an entire length thereof as it goes toward the second end.

In another aspect of the invention, it is preferred that the groove width of the first curved portion is gradually increased as it goes toward the first end over the entire length thereof, and the groove width of the second curved portion is gradually increased as it goes toward the second end over the entire length thereof.

In another aspect of the invention, it is preferred that the first curved portion protrudes in the first direction from the first end, and the second curved portion protrudes in the second direction from the second end.

In another aspect of the invention, it is preferred that an angle of the first curved portion at the first end is in a range of from 30 to 70 degrees with respect to the tyre circumferential direction, and an angle of the second curved portion at the second end is in a range of from 30 to 70 degrees with respect to the tyre circumferential direction.

In another aspect of the invention, it is preferred that the first curved portion and the second curved portion are connected with each other at a center portion in a tyre axial direction of the rib.

In another aspect of the invention, it is preferred that a groove width at the first end or at the second end of the lateral groove is in a range of from 2 to 4 times a minimum groove width of the lateral groove.

In another aspect of the invention, it is preferred that the rib is provided with only the lateral groove.

In another aspect of the invention, it is preferred that the rib is a crown rib arranged on a tyre equator.

In another aspect of the invention, it is preferred that the tread portion includes a middle rib adjacent to the crown rib, and the middle rib is provided with a first middle lateral groove extending in a curved shape convex toward the same direction as the first curved portion, or a second middle lateral groove extending in a curved shape convex toward the same direction as the second curved portion.

DESCRIPTION OF THE PREFERRED EMBODIMENT

An embodiment of the present invention will now be described below in detail in conjunction with accompanying drawings.

Figure 1:
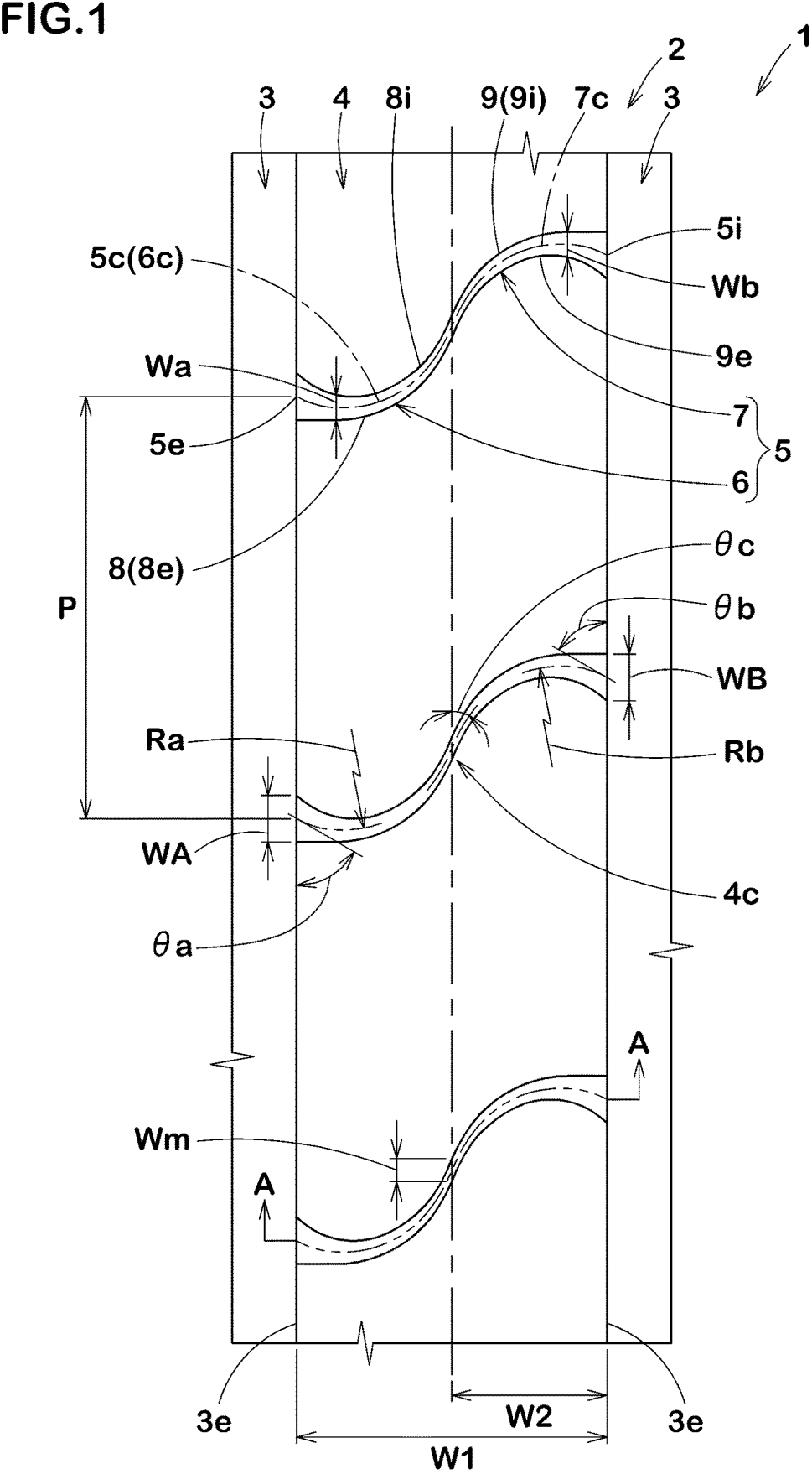
FIG. 1 is a partial development view of a tread portion of a tyre according to an embodiment of the present invention.

FIG. 1 is a partial development view of a tread portion 2 of a tyre 1 in this embodiment. The tyre 1 in this embodiment can be used for a tyre of various categories such as a pneumatic tyre for a passenger car, for a motorcycle, and for heavy load, and a non-pneumatic tyre not filled with pressurized air therein, for example. The tyre 1 in this embodiment is configured as a pneumatic tyre for heavy load.

The tread portion 2 in this embodiment is provided with a rib 4 divided by at least one main groove 3 extending continuously in a tyre circumferential direction. The rib 4 in this embodiment is divided by two main grooves 3. Note that the rib 4 is not limited to such an embodiment, it may be divided by the main groove 3 and one of tread edges (Te) (shown in FIG. 4), for example.

The "tread edges (Te)" are defined as outermost ground contacting positions in a tyre axial direction when the tyre 1 in a standard state is in contact with a flat surface with zero camber angles by being loaded with a standard tyre load. A width in the tyre axial direction between the tread edges (Te) is defined as a tread width TW.

The "standard state" is a state in which the tyre 1 is mounted on a standard rim (not shown), inflated to a standard inner pressure, and loaded with no tyre load.
In this specification, dimensions and the like of various parts of the tyre 1 are those measured under the standard state unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The rib 4 in this embodiment is provided with lateral grooves 5 each extending between a first end (5e) (on the left side in the figure) and a second end (5i) (on the right side in the figure) so as to completely cross the rib 4. Thereby, the wet performance is improved. The first end (5e) and the second end (5i) in this embodiment are the positions at which a groove center line (5c) of a respective one of the lateral grooves 5 intersects with a corresponding one of groove edges (3e) of a respective one of the main grooves 3.

Each of the lateral grooves 5 is configured to include a first curved portion 6 and a second curved portion 7. The first curved portion 6 in this embodiment extends from the first end (5e) in a curved shape convex in a first direction (the lower side in the figure) in the tyre circumferential direction. The second curved portion 7 in this embodiment extends from the second end (5i) in a curved shape convex in a second direction (the upper side in the figure) in the tyre circumferential direction. With the curved lateral grooves 5 configured as such, occurrence of noise at the time of contacting with the ground is suppressed as compared with linear lateral grooves (not shown). Each of the lateral grooves 5 in this embodiment is formed only by the first curved portion 6 and the second curved portion 7.

The first curved portion 6 in this embodiment has a groove width (Wa) gradually increasing as it goes toward the first end (5e) over the entire length thereof. The first curved portion 6 configured as such improve drainage capacity of the rib 4 on an outer side in a width direction thereof. Further, rigidity decrease is suppressed on an inner side in the width direction of the rib 4, therefore, slippage at the time of contacting with the ground is suppressed eventually. Thereby, the uneven wear resistance performance of the rib 4 is improved. In this specification, a groove width is defined as a distance in the tyre circumferential direction between groove edges thereof.

The second curved portion 7 in this embodiment has a groove width (Wb) gradually increasing as it goes toward the second end (5i) over the entire length thereof. The second curved portion 7 configured as such also increases the drainage capacity of the rib 4 on the outer side in the width direction thereof. Further, in a part of the rib 4 on the inner side in the width direction thereof, the rigidity decrease is suppressed, therefore, the slippage at the time of contacting with the ground is suppressed eventually. Thereby, the uneven wear resistance performance of the rib 4 is improved. As described above, the first curved portion 6 in this embodiment has the groove width (Wa) gradually increasing over the entire length thereof as it goes toward the first end (5e) and the second curved portion 7 in this embodiment has the groove width (Wb) gradually increasing over the entire length thereof as it goes toward the second end (5i), therefore, the noise performance, the wet performance, and the uneven wear resistance performance are greatly improved.

The first curved portion 6 in this embodiment protrudes in the first direction from the first end (5e). A groove center line (6c) of the first curved portion 6 protrudes in the first direction from the first end (5e), for example. In the first curved portion 6 configured as such, groove edges 8 thereof gradually leave a road surface, therefore, compressed air in the first curved portion 6 is gradually released. Thereby, pumping sound generated by the first curved portion 6 is made small, therefore, the noise performance is increased. Further, in the first curved portion 6 configured as such, progress of the air passing through the groove is hindered, therefore, the noise performance is improved. The second curved portion 7 in this embodiment protrudes in the second direction from the second end (5i). A groove center line (7c) of the second curved portion 7 protrudes in the second direction from the second end (5i), for example. Thereby, the above-described effects are effectively exerted.

In the first curved portion 6 in this embodiment, a groove edge (8e) on a side of the first direction extends in the tyre axial direction between intersection positions thereof with groove edges (3e). Further, in the first curved portion 6 in this embodiment, a groove edge (8i) thereof on a side of the second direction protrudes in the first direction from an intersection position thereof with one of the groove edges (3e) adjacent thereto. In the second curved portion 7 in this embodiment, a groove edge (9i) thereof on the side of the second direction extends in the tyre axial direction between intersection positions thereof with groove edges (3e). In the second curved portion 7 in this embodiment, a groove edge (9e) thereof on the side of the first direction protrudes in the second direction from an intersection position thereof with one of the groove edges (3e) adjacent thereto.

It is preferred that an angle ($\theta a$) of the first curved portion 6 at the first end (5e) is in a range of from 30 to 70 degrees with respect to the tyre circumferential direction. Thereby, the rigidity decrease of the rib 4 in the vicinity of the first end (5e) is suppressed, and the groove edges 8 of the first curved portion 6 do not leave a road surface simultaneously over a length direction thereof. Thereby, it is possible that the uneven wear resistance performance and the noise performance of the rib 4 are improved. From such a point of view, it is preferred that an angle ($\theta b$) of the second curved portion 7 at the second end (5i) is in a range of from 30 to 70 degrees with respect to the tyre circumferential direction. Note that, in this specification, an angle of a groove is represented by an angle on the acute angle side.

The first curved portion 6 in this embodiment extends in an arc shape having a radius of curvature (Ra) in a range of from 12 to 22 mm. When the radius of curvature (Ra) of the first curved portion 6 is less than 12 mm, the rigidity decrease of the rib 4 due to the first curved portion 6 becomes large, therefore, it is possible that the uneven wear resistance performance is deteriorated. Further, drainage resistance becomes large, therefore, it is possible that the wet performance cannot be improved. When the radius of curvature (Ra) of the first curved portion 6 is larger than 22 mm, the effect of decreasing the progress of the air passing through the first curved portion 6 becomes small, therefore, improvement of the noise performance cannot be expected. From such a point of view, it is preferred that the second curved portion 7 also extends in an arc shape having a radius of curvature (Rb) in a range of from 12 to 22 mm. The radii of curvature (Ra) and (Rb) are represented by the groove center lines (6c) and (7c), respectively.

The first curved portion 6 and the second curved portion 7 in this embodiment are connected with each other at a center portion (4c) in the tyre axial direction of the rib 4. Thereby, it is possible that water in the lateral grooves 5 is discharged smoothly and equally to both sides in the tyre axial direction of the rib 4. Therefore, the wet performance is improved. The center portion (4c) is a region positioned at the center when a maximum width W1 in the tyre axial direction of the rib 4 is divided into five equal parts. The first curved portion 6 and the second curved portion 7 in this embodiment are connected with each other at the center in the tyre axial direction of the rib 4.

The first curved portion 6 and the second curved portion 7 in this embodiment are smoothly connected with each other. with the lateral grooves 5 configured as such, it is possible that the rigidity decrease is greatly suppressed on the inner side in the width direction of the rib 4. In each of the lateral grooves 5 in this embodiment, the groove center line (6c) of the first curved portion 6 and the groove center line (7c) of the second curved portion 7 are connected with each other. In order to effectively exert the above-described effects, a tangential line of the groove center line (6c) of the first curved portion 6 and a tangential line of the groove center line (7c) of the second curved portion 7 are inclined at an equal angle (θc) and connected with each other.

Each of the lateral grooves 5 in this embodiment has a point symmetrical shape with respect to the center portion (4c) of the rib 4. The lateral grooves 5 configured as such make rigidity change of the rib 4 small, therefore, the uneven wear resistance performance is maintained high. Note that the expression "point symmetrical" here includes an embodiment of point symmetry in a strict sense, and also includes an embodiment those skilled in the art can perceive as point symmetrical to the extent that the effect of the present invention is achieved.

It is preferred that each of a groove width WA at the first end (5e) and a groove width WB at the second end (5i) of each of the lateral grooves 5 is in a range of from 2 to 4 times a minimum groove width (Wm) of each of the lateral grooves 5. Thereby, the rigidity decrease of the rib 4 is suppressed at the first end (5e) or the second end (5i) and at the center portion (4c) of the rib 4, and smooth drainage from the first end (5e) or the second end (5i) is maintained, therefore, the uneven wear resistance performance and the wet performance are improved in a good balance. It is preferred that each of the groove width WA at the first end (5e) and the groove width WB at the second end (5i) of each of the lateral grooves 5 is in a range of from 4.0 to 8.0 mm, for example. It is preferred that the minimum groove width (Wm) of each of the lateral grooves 5 is in a range of from 0.5 to 3.5 mm, for example.

It is preferred that each of the groove width WA at the first end (5e) and the groove width WB at the second end (5i) of each of the lateral grooves 5 is in a range of from 0.15 to 0.45 times a half width W2 in the tyre axial direction of the rib 4. when each of the groove width WA at the first end (5e) and the groove width WB at the second end (5i) of each of the lateral grooves 5 is less than 0.15 times the half width W2 of the rib 4, it is possible that the wet performance is deteriorated. When each of the groove width WA at the first end (5e) and the groove width WB at the second end (5i) of each of the lateral grooves 5 is more than 0.45 times the half width W2 of the rib 4, it is possible that the noise performance and the uneven wear resistance performance are deteriorated.

In each of the lateral grooves 5, the first end (5e) is arranged on the side of the first direction of the second end (5i). Thereby, tyre circumferential direction components of the groove edges 8 of the first curved portion 6 and groove edges 9 of the second curved portion 7 are largely ensured, therefore, it is possible that the pumping sound is further decreased. From such a point of view, a distance (La) (shown in FIG. 4) in the tyre circumferential direction between the first end (5e) and the second end (5i) of each of the lateral grooves 5 is preferably 60% or more, and more preferably 70% or more of the half width W2 of the rib 4.

When the distance (La) is excessively large, it is possible that the rigidity decrease of the rib 4 becomes large. Thereby, the distance (La) is preferably smaller than the half width W2, and more preferably 95% or less of the half width W2.

The lateral grooves 5 are arranged at intervals in the tyre circumferential direction. From a point of view of suppressing the rigidity decrease of the rib 4, it is preferred that a pitch (P) in the tyre circumferential direction of the lateral grooves 5 is larger than the maximum width W1 in the tyre axial direction of the rib 4, and it is preferred that the pitch (P) of the lateral grooves 5 is 1.1 times or more of the maximum width W1 of the rib 4, for example. When the pitch (P) of the lateral grooves 5 is excessively larger than the maximum width W1 of the rib 4, it is possible that the wet performance cannot be improved. Thereby, the pitch (P) of the lateral grooves 5 is preferably 1.5 times or less, and more preferably 1.3 times or less of the maximum width W1 of the rib 4.

Figure 2A:
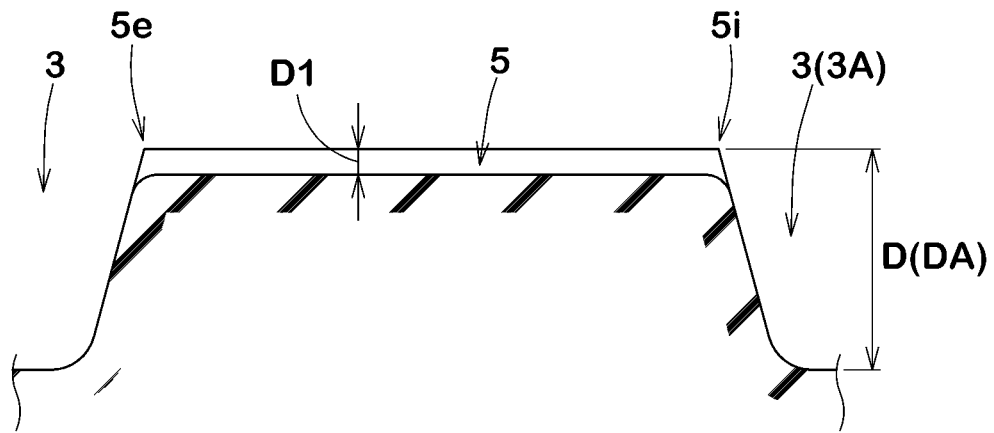
FIG. 2A is a cross-sectional view taken along A-A line of FIG. 1.

FIG. 2A is a cross-sectional view of one of the lateral grooves 5 taken along A-A line of FIG. 1. As shown in FIG. 2A, it is preferred that a groove depth D1 of each of the lateral grooves 5 is in a range of from 1.0 to 3.5 mm. When the groove depth D1 is less than 1.0 mm, it is possible that the wet performance is deteriorated. When the groove depth D1 is more than 3.5 mm, the rigidity decrease of the rib 4 becomes large, therefore, deformation of the rib 4 becomes large, thereby, an amount of air compressed in the lateral grooves 5 is increased, thus, it is possible that the noise performance is deteriorated.

Each of the lateral grooves 5 in this embodiment is configured to have the constant groove depth except for the first end (5e) and the second end (5i). Thereby, the above-described effects are maintained high. In each of the lateral grooves 5, the groove depth D1 is gradually increased as it goes toward an outer side in the tyre axial direction at the first end (5e) and the second end (5i). Therefore, it is possible that the rigidity decrease at a groove bottom thereof is suppressed and that the wet performance is improved.

As shown in FIG. 1, the rib 4 in this embodiment is provided only with the lateral grooves 5. That is, the rib 4 is not provided with other grooves or sipes as incisions except for the lateral grooves 5 each including the first curved portion 6 and the second curved portion 7. In the rib 4 configured as such, the rigidity decrease is largely suppressed.

Figure 3:
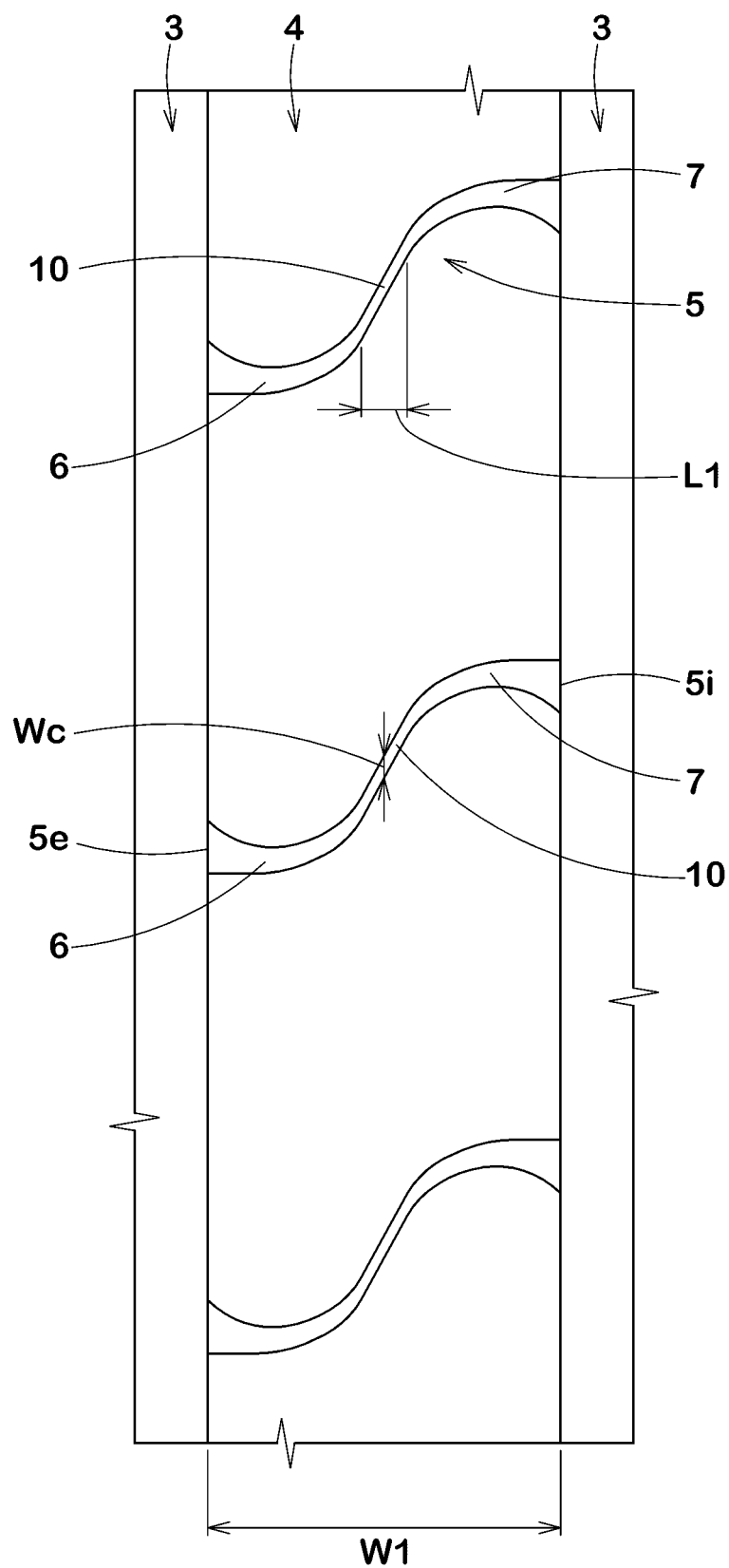
FIG. 3 is a plan view of lateral grooves according to another embodiment of the present invention.

FIG. 3 is a plan view of the lateral grooves 5 according to another embodiment of the present invention. Each of the lateral grooves 5 may be formed by the first curved portion 6, the second curved portion 7, and a linear portion 10, for example. The linear portion 10 in this embodiment is arranged between the first curved portion 6 and the second curved portion 7, and is inclined with respect to the tyre circumferential direction at a constant angle. The linear portion 10 may be configured to have a constant groove width (Wc) or the groove width (Wc) may be increased from a center of the linear portion 10 toward the first end (5e) or the second end (5i), for example. The linear portion 10 configured as such maintains the wet performance. The linear portion 10 in this embodiment is configured to have the constant groove width (Wc) and is connected smoothly with the first curved portion 6 and the second curved portion 7.

A length L1 in the tyre axial direction of the linear portion 10 is set to be 20% or less of the maximum width W1 in the tyre axial direction of the rib 4, for example. When the length L1 of the linear portion 10 is more than 20% of the maximum width W1 of the rib 4, it is possible that the noise at the time of contacting with the ground becomes large.

Figure 4:
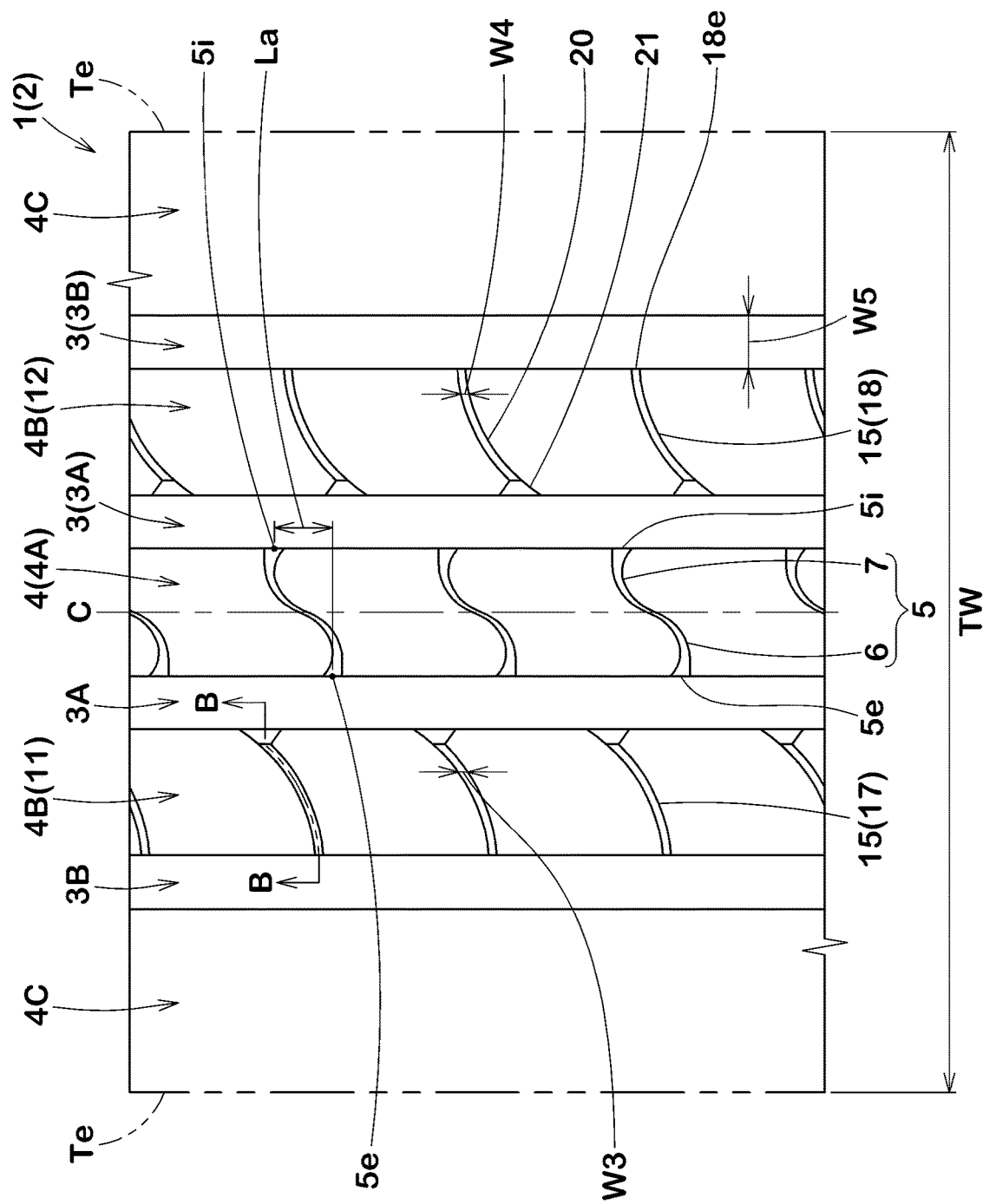
FIG. 4 is a development view of the whole tread portion.

FIG. 4 is a development view of the whole tread portion in this embodiment. As shown in FIG. 4, this tread portion 2 is provided with a plurality of the main grooves 3. The main grooves 3 include a pair of crown main grooves 3A arranged on both sides of a tyre equator (C), and a pair of shoulder main grooves 3B each arranged between a respective one of the crown main grooves 3A and one of the tread edges (Te) adjacent thereto.

Thereby, the tread portion 2 includes one crown rib 4A, a pair of middle ribs 4B, and a pair of shoulder ribs 4C. The crown rib 4A is defined between a pair of the crown main grooves 3A and includes the tyre equator (C). Each of the middle ribs 4B is defined between a respective one of the shoulder main grooves 3B and its adjacent one of the crown main grooves 3A. Each of the shoulder ribs 4c is defined between a respective one of the shoulder main grooves 3B and its adjacent one of the tread edges (Te). Note that the tread portion 2 is not limited to such an embodiment, and it can be embodied in various embodiments.

The crown rib 4A is the rib 4 in which the rigidity decrease is likely to occur since large ground contact pressure is applied thereto during running straight. In this embodiment, the lateral grooves 5 are provided in the crown rib 4A to which large ground contact pressure is applied. Thereby, large rigidity decrease of the crown rib 4A is suppressed on an inner side in a width direction thereof, therefore, the uneven wear resistance performance is largely improved.

Note that the lateral grooves 5 are provided not only in the crown rib 4A configured as such, and they may be provided in the middle ribs 4B and the shoulder ribs 4c, for example.

The middle ribs 4B in this embodiment include a first middle rib 11 adjacent to the crown rib 4A on a side of the first curved portions 6 and a second middle rib 12 adjacent to the crown rib 4A on a side of the second curved portions 7.

The middle ribs 4B in this embodiment are provided with middle lateral grooves 15. The middle lateral grooves 15 configured as such are also helpful improving the wet performance. Each of the middle lateral grooves 15 in this embodiment completely crosses a respective one of the middle ribs 4B.

Each of the middle lateral grooves 15 extends in a curved shape convex toward only either the first direction or the second direction, for example. The middle lateral grooves 15 configured as such suppress the rigidity decrease of the middle ribs 4B and improve the noise performance.

The middle lateral grooves 15 include first middle lateral grooves 17 each extends in a curved shape convex toward the same direction as the first curved portions 6 or second middle lateral grooves 18 each extends in a curved shape convex toward the same direction as the second curved portions 7. The middle lateral grooves 15 in this embodiment include only the first middle lateral grooves 17 and the second middle lateral grooves 18. The first middle lateral grooves 17 in this embodiment are provided in the first middle rib 11. As described above, the first middle lateral grooves 17 in this embodiment are adjacent to the first curved portion 6 in the tyre axial direction with one of the main grooves 3 therebetween. Thereby, the first middle lateral grooves 17 and the first curved portions 6 deform in the same direction with respect to lateral force during cornering, therefore, apparent rigidity of the first middle rib 11 and the crown rib 4A on a side of the first curved portions 6 is maintained high. Thereby, the uneven wear resistance performance is improved.

The second middle lateral grooves 18 in this embodiment are provided in the second middle rib 12. Thereby, in this embodiment, the second middle lateral grooves 18 are adjacent to the second curved portion 7 in the tyre axial direction with one of the main grooves 3 therebetween. Therefore, the above-described effects are effectively exerted.

Each of the first middle lateral grooves 17 in this embodiment has a groove width W3 increased locally at an end portion thereof on a side of the crown rib 4A. The first middle lateral grooves 17 configured as such improve drainage property to the crown main groove 3A and suppress rigidity decrease of a part thereof on a side of the tread edge (Te) to which large lateral force is applied during cornering. From such a point of view, each of the second middle lateral grooves 18 in this embodiment has a groove width W4 locally increased at an end portion thereof on a side of the crown rib 4A.

Figure 5:
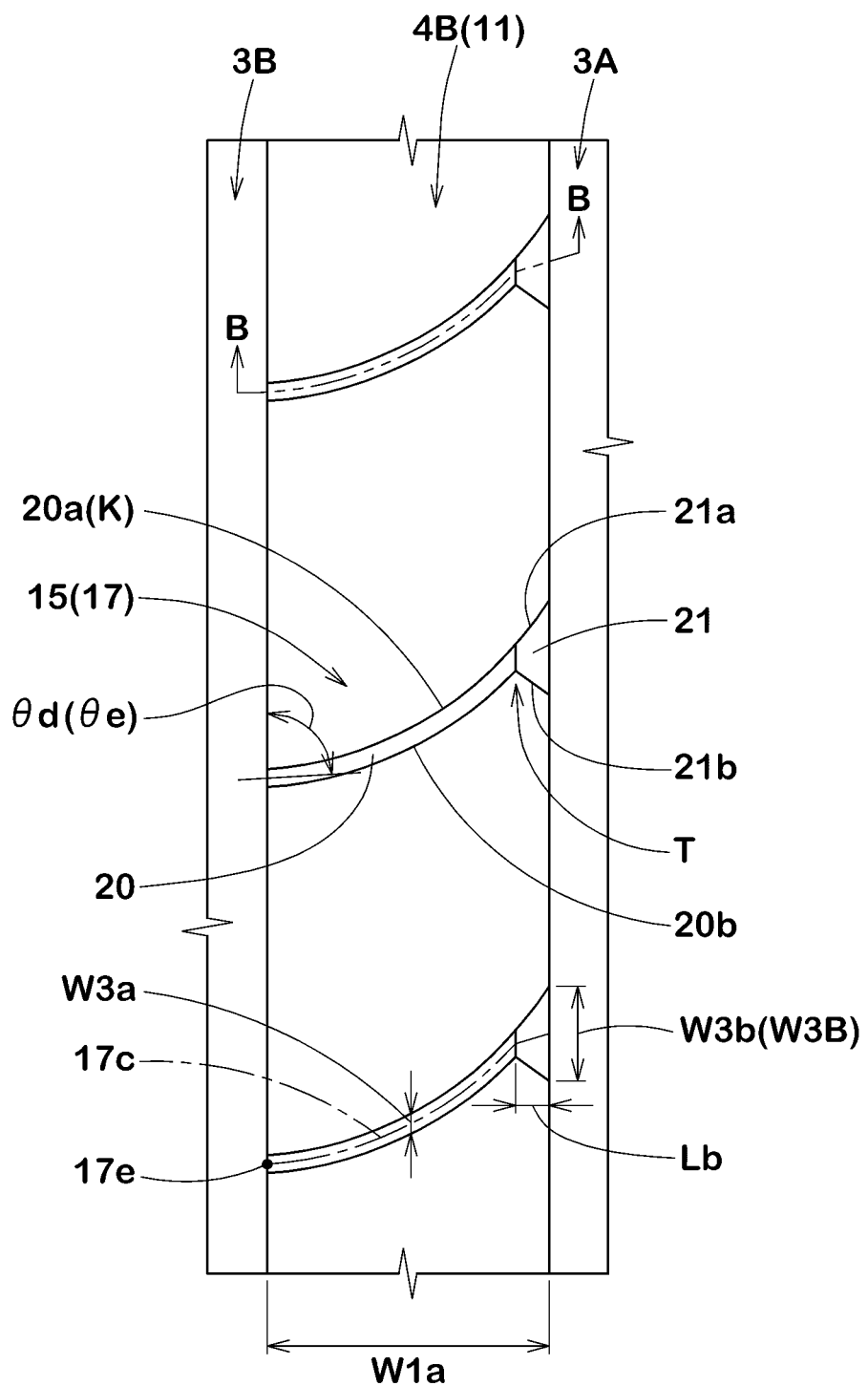
FIG. 5 is an enlarged view of a middle rib of FIG. 4.

FIG. 5 shows the first middle rib 11 as a representative of the middle ribs 4B. In this specification, hereinafter, description of elements of the first middle rib 11 can be adopted to the second middle rib 12 as well unless otherwise specified. As shown in FIG. 5, each of the middle lateral grooves 15 in this embodiment has a constant width portion 20 and a gradually increasing portion 21. The constant width portion 20 extends with a constant groove width (W3a) in a longitudinal direction thereof and the gradually increasing portion 21 has a groove width (W3b) gradually increasing as it goes toward the crown main grooves 3A. The constant width portion 20 is connected with the shoulder main grooves 3B. The gradually increasing portion 21 is connected with the crown main grooves 3A.

An angle (θd) of the constant width portion 20 with respect to the tyre circumferential direction is gradually increased as it goes toward the outer side in the tyre axial direction. The constant width portions 20 configured as such maintain the rigidity in the tyre axial direction of the first middle rib 11 toward the outer side in the tyre axial direction, therefore, uneven wear during cornering is suppressed.

Each of the first middle lateral grooves 17 of the first middle rib 11 is configured so as not to protrude in the first direction from an outer end (17e) in the tyre axial direction of the first middle lateral groove 17. That is, in each of the first middle lateral grooves 17 in this embodiment, the outer end (17e) is protruded most to the side of the first direction. By the first middle lateral grooves 17 configured as such, it is possible that water in the grooves is smoothly discharged toward the shoulder main groove 3B. Further, the rigidity decrease is suppressed in a part of the first middle rib 11 on the side of the tread edge (Te) to which large lateral force is applied during cornering. From such a point of view, as shown in FIG. 4, each of the second middle lateral grooves 18 is also configured so as not to protrude in the second direction from an outer end (18e) in the tyre axial direction of the second middle lateral groove 18.

As shown in FIG. 5, in each of the first middle lateral grooves 17, an angle (θe) with respect to the tyre circumferential direction at the outer end (17e) of the first middle lateral groove 17 is preferably larger than the angle (θa) of the first curved portion 6, more preferably 80 degrees or more, and further preferably 85 degrees or more, for example. Thereby, it is possible that the rigidity decrease in the tyre axial direction is suppressed at the outer end (17e) to which larger lateral force is applied during cornering than the crown rib 4A. From such a point of view, it is preferred that an angle (not shown) with respect to the tyre circumferential direction of each of the second middle lateral grooves 18 at the outer end (18e) thereof is equal to the angle (θe) of each of the first middle lateral grooves 17.

In each of the lateral grooves 15, a groove edge (20a) on one side of the constant width portion 20 is smoothly connected with a groove edge (21a) on one side of the gradually increasing portion 21. The groove edge (20a) on one side of the constant width portion 20 and the groove edge (21a) on one side of the gradually increasing portion 21 in this embodiment form a smooth curved portion (K). Thereby, besides it is possible that water in the groove is smoothly discharged, the rigidity decrease of the first middle rib 11 is suppressed.

In each of the lateral grooves 15, a groove edge (20b) on the other side of the constant width portion 20 is connected with a groove edge (21b) on the other side of the gradually increasing portion 21 so as to form an apex portion (T) convex toward a groove center line (17c).

It is preferred that a maximum groove width W36 of the gradually increasing portion 21 is in a range of from 2 to 7 times the groove width (W3a) of the constant width portion 20. Thereby, improvement of the wet performance is ensured while the rigidity decrease of the middle ribs 4B is suppressed. It is preferred that the groove width (W3a) of the constant width portion 20 is in a range of from 3% to 10% of a maximum width (W1a) in the tyre axial direction of each of the middle ribs 4B.

In order to effectively exert the above-described effects, it is preferred that a length (Lb) in the tyre axial direction of the gradually increasing portion 21 is in a range of from 5% to 15% of the maximum width (W1a) of each of the middle ribs 4B.

Figure 2B:
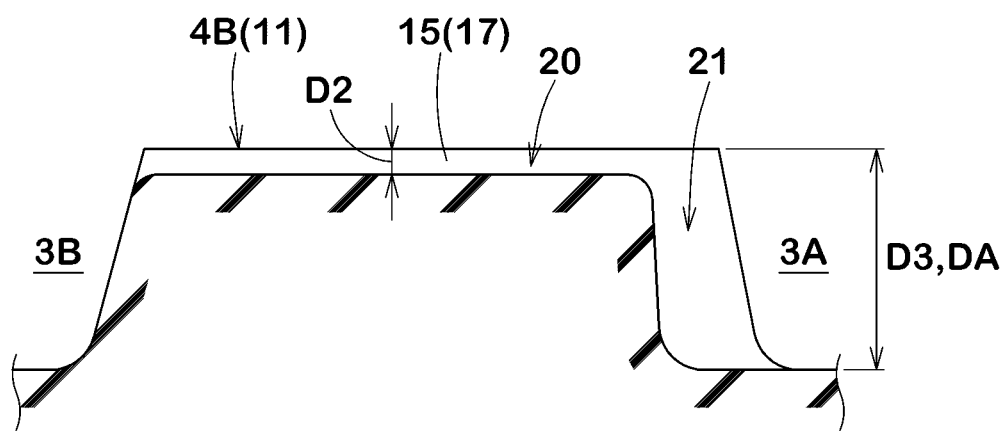
FIG. 2B is a cross-sectional view taken along B-B line of FIG. 5.

FIG. 2B is a cross-sectional view of one of the middle lateral grooves 15. As shown in FIG. 2B, a groove depth D2 of the constant width portion 20 is configured to be smaller than a groove depth of the gradually increasing portion 21. Thereby, the rigidity decrease of the middle ribs 4B is suppressed and smooth discharge of water from the gradually increasing portion 21 is ensured. It is preferred that the groove depth D2 of the constant width portion 20 is in about a range of from 1 to 3.5 mm. It is preferred that a groove depth D3 of the gradually increasing portion 21 is in a range of from 80% to 100% of a groove depth DA of the crown main grooves 3A.

As shown in FIG. 4, the shoulder ribs 4c in this embodiment is configured as a plain rib not provided with a groove and a sipe. The shoulder ribs 4c configured as such largely improve the uneven wear resistance performance. Note that the shoulder ribs 4c are not limited to such an embodiment, and they may be provided with lateral grooves and sipes, for example.

Although not particularly limited, a groove width W5 is preferably 2% or more, more preferably 3% or more of the tread width TW, and preferably 8% or less, more preferably 7% or less of the tread width TW, for example. A groove depth (D) (shown in FIG. 2A) of each of the main grooves 3 is preferably 10 mm or more, more preferably 15 mm or more, and preferably 20 mm or less, more preferably 18 mm or less.

Although not particularly limited, the maximum width W1 of the rib 4 is preferably 8% or more, more preferably 10% or more of the tread width TW, and preferably 28% or less, more preferably 26% or less of the tread width TW, for example.

While detailed description has been made of the tyre as an embodiment of the present invention, the present invention can be embodied in various forms without being limited to the illustrated embodiment.

Working Examples (Examples)

Pneumatic tyres for heavy load having the basic pattern shown in FIG. 4 were made by way of test according to the specifications listed in Table 1, and each of the test tyres was tested for the wet performance, the noise performance, and the uneven wear resistance performance. Note that the common specifications are as follows.

Tyre size: 385/65R22.5
Tyre inner pressure: 900 kPa
Maximum width W1 of crown rib/tread width TW: 13.5%
Maximum width (W1a) of middle rib/tread width TW: 12.9%

Regarding "presence or absence of gradual increase" in the Table 1, "absence" indicates that the groove width of each of the curved portions is configured to be constant.

Regarding "presence or absence of protrusion" in the Table 1, "absence" indicates the first curved portion in which the first end is arranged most in the first direction side or the second curved portion in which the second end is arranged most in the second direction side.

<Wet Performance>

The test tyres were mounted on steering wheels of a truck, then the truck was driven on a wet paved road surface at a speed of 80 km/h, sudden braking was performed, and then a braking distance was measured. The test results are indicated by an index based on Reference 1 being 100, wherein a smaller numerical value is better.

<Noise Performance>

The test tyres were mounted on the steering wheels of the truck, and then while the truck was driven on a road noise measuring road (a dry road having a rough asphalt surface) at a speed of 70 km/h, outside-vehicle noise was measured. The test results are indicated by an index based on the Reference 1 being 100, wherein a smaller numerical value is better.

<Uneven Wear Resistance Performance>

The test tyres were mounted on the steering wheels of the truck, and then wear amounts were measured at a plurality of positions of each of the test tyres after running on a predetermined route for a predetermined distance. The uneven wear resistance performance was evaluated based on the variation in the wear amounts described above. The results are indicated by an index based on the Reference 1 being 100, wherein a smaller numerical value is better.

The test results are shown in the Table 1.

TABLE 1

| | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Presence (P) or absence (A) of gradual increase of Groove width of First curved portion over entire length | A | P | P | P | P | P | P | P | P | P |

TABLE 1-continued

|  | | | | | | | | | | |
|---|---|---|---|---|---|---|---|---|---|---|
| Presence (P) or absence (A) of gradual increase of Groove width of Second curved portion over entire length | A | A | P | P | P | P | P | P | P | P |
| Angles (θa) and (θb) [degree] | 70 | 60 | 60 | 75 | 60 | 60 | 60 | 60 | 60 | 60 |
| Presence (P) or absence (A) of protrusion of First curved portion in First direction from First end | A | P | P | P | A | P | P | P | P | P |
| Presence (P) or absence (A) of protrusion of Second curved portion in Second direction from Second end | A | P | P | P | A | A | P | P | P | P |
| Groove depth D1 of Lateral groove [mm] | 2.0 | 2.0 | 2.0 | 2.0 | 2.0 | 2.0 | 0.5 | 1.0 | 3.5 | 4.0 |
| Ratio (WA/Wm) and (WB/Wm) of Groove widths of Lateral grooves | 1 | 3 | 3 | 3 | 3 | 3 | 3 | 3 | 3 | 3 |
| Minimum groove width (Wm) of Lateral groove | 2.0 | 1.0 | 1.0 | 1.0 | 1.0 | 1.0 | 1.0 | 1.0 | 1.0 | 1.0 |
| Radii of curvature (Ra) and (Rb) [mm] | 15 | 15 | 15 | 15 | 15 | 15 | 15 | 15 | 15 | 15 |
| Wet performance [index: smaller numerical value is better] | 100 | 90 | 85 | 82 | 80 | 82 | 90 | 87 | 82 | 80 |
| Noise performance [index: smaller numerical value is better] | 100 | 95 | 90 | 92 | 95 | 92 | 90 | 90 | 92 | 95 |
| Uneven wear resistance performance [index: smaller numerical value is better] | 100 | 95 | 95 | 97 | 95 | 95 | 93 | 93 | 95 | 97 |

|  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| Presence (P) or absence (A) of gradual increase of Groove width of First curved portion over entire length | P | P | P | P | P | P | P | P | P | P |
| Presence (P) or absence (A) of gradual increase of Groove width of Second curved portion over entire length | P | P | P | P | P | P | P | P | P | P |
| Angles (θa) and (θb) [degree] | 60 | 60 | 60 | 60 | 60 | 60 | 60 | 60 | 60 | 60 |
| Presence (P) or absence (A) of protrusion of First curved portion in First direction from First end | P | P | P | P | P | P | P | P | P | P |
| Presence (P) or absence (A) of protrusion of Second curved portion in Second direction from Second end | P | P | P | P | P | P | P | P | P | P |
| Groove depth D1 of Lateral groove [mm] | 2.0 | 2.0 | 2.0 | 2.0 | 2.0 | 2.0 | 2.0 | 2.0 | 2.0 | 2.0 |
| Ratio (WA/Wm) and (WB/Wm) of Groove widths of Lateral grooves | 1.5 | 2 | 4 | 5 | 3 | 3 | 3 | 3 | 3 | 3 |
| Minimum groove width (Wm) of Lateral groove | 1.0 | 1.0 | 1.0 | 1.0 | 0.5 | 4.0 | 3.0 | 1.0 | 1.0 | 1.0 |
| Radii of curvature (Ra) and (Rb) [mm] | 15 | 15 | 15 | 15 | 15 | 15 | 15 | 10 | 20 | 30 |
| Wet performance [index: smaller numerical value is better] | 95 | 90 | 82 | 80 | 90 | 80 | 83 | 87 | 83 | 83 |
| Noise performance [index: smaller numerical value is better] | 85 | 87 | 90 | 92 | 85 | 94 | 92 | 88 | 92 | 95 |
| Uneven wear resistance performance [index: smaller numerical value is better] | 92 | 94 | 95 | 97 | 92 | 98 | 96 | 97 | 95 | 93 |

From the test results, it was confirmed that the tyres as Examples were better than the tyres as the Reference. Further, the same tests were also conducted on tyres in which the groove widths of the main grooves and the widths of the ribs were changed within the preferred ranges, but the similar results were obtained.

The invention claimed is:
1. A tyre comprising a tread portion, wherein
the tread portion is provided with a rib divided by at least one main groove extending continuously in a tyre circumferential direction,
the rib is provided with a lateral groove extending between a first end and a second end thereof so as to completely cross the rib,
the lateral groove includes a first curved portion and a second curved portion,
the first curved portion extends from the first end in a curved shape convex in a first direction in the tyre circumferential direction,
the second curved portion extends from the second end in a curved shape convex in a second direction in the tyre circumferential direction,
a groove width of the first curved portion is gradually increased over an entire length thereof as it goes toward the first end, or a groove width of the second curved portion is gradually increased over an entire length thereof as it goes toward the second end,
each of the first curved portion and the second curved portion has a first direction side edge and a second direction side edge,
the first direction side edge of the first curved portion has a linear portion extending inward in a width direction of the rib and parallel to a tyre axial direction from the first end side edge of the rib, the second direction side edge of the first curved portion extends in a continuously curved shape over an entire length thereof so as to protrude more toward the first direction from an intersection position between the second direction side edge of the first curved portion and the first end side edge of the rib, the first direction side edge of the second curved portion extends in a continuously curved shape over an entire length thereof so as to protrude more toward the second direction from an intersection position between the first direction side edge of the second curved portion and the second end side edge of the rib, and the second direction side edge of the second curved portion has a linear portion extending inward in the width direction of the rib and parallel to the tyre axial direction from the second end side edge of the rib.

2. The tyre according to claim 1, wherein
the groove width of the first curved portion is gradually increased as it goes toward the first end over the entire length thereof, and
the groove width of the second curved portion is gradually increased as it goes toward the second end over the entire length thereof.

3. The tyre according to claim 1, wherein
the first curved portion protrudes in the first direction from the first end, and
the second curved portion protrudes in the second direction from the second end.

4. The tyre according to claim 1, wherein
an angle of the first curved portion at the first end is in a range of from 30 to 70 degrees with respect to the tyre circumferential direction, and
an angle of the second curved portion at the second end is in a range of from 30 to 70 degrees with respect to the tyre circumferential direction.

5. The tyre according to claim 1, wherein the first curved portion and the second curved portion are connected with each other at a center portion in a tyre axial direction of the rib.

6. The tyre according to claim 1, wherein a groove width at the first end or at the second end of the lateral groove is in a range of from 2 to 4 times a minimum groove width of the lateral groove.

7. The tyre according to claim 1, wherein the rib is provided with only the lateral groove.

8. The tyre according to claim 1, wherein the rib is a crown rib arranged on a tyre equator.

9. The tyre according to claim 8, wherein
the tread portion includes a middle rib adjacent to the crown rib, and
the middle rib is provided with a first middle lateral groove extending in a curved shape convex toward the same direction as the first curved portion, or a second middle lateral groove extending in a curved shape convex toward the same direction as the second curved portion.

10. The tyre according to claim 1, wherein the first curved portion and the second curved portion extend in an arc shape having a radius of curvature in a range of from 12 to 22 mm.

11. The tyre according to claim 1, wherein
each of the groove widths at the first end and the second end of the lateral groove is in a range of from 4.0 to 8.0 mm, and
the minimum groove width of the lateral groove is in a range of from 0.5 to 3.5 mm.

12. The tyre according to claim 1, wherein each of groove widths at the first end and the second end of the lateral groove is in a range of from 0.15 to 0.45 times a half width in a tyre axial direction of the rib.

13. The tyre according to claim 1, wherein a distance in the tyre circumferential direction between the first end and the second end of the lateral groove is 60% or more of a half width in a tyre axial direction of the rib and smaller than the half width.

14. The tyre according to claim 1, wherein
the rib is provided with a plurality of the lateral grooves arranged at intervals in the tyre circumferential direction, and
a pitch in the tyre circumferential direction of the lateral grooves is larger than a maximum width in a tyre axial direction of the rib and 1.5 times or less of the maximum width.

15. The tyre according to claim 1, wherein a groove depth of the lateral groove is in a range of from 1.0 to 3.5 mm.

16. The tyre according to claim 1, wherein
the tread portion includes a middle rib adjacent to the rib,
the middle rib is provided with a middle lateral groove extending in a curved shape convex toward only either the first direction or the second direction,
the middle lateral groove is either a first middle lateral groove or a second middle lateral groove,
the first middle lateral groove extends in a curved shape convex toward a same direction as the first curved portion, and
the second middle lateral groove extends in a curved shape convex toward a same direction as the second curved portion.

17. The tyre according to claim 16, wherein
the middle rib is adjacent to the rib with the at least one main groove therebetween,
the middle lateral groove has a constant width portion and a gradually increasing portion,
the constant width portion extends with a constant groove width in a longitudinal direction thereof, and
the gradually increasing portion has a groove width gradually increasing as it goes toward the at least one main groove.

18. The tyre according to claim 17, wherein an angle of the constant width portion with respect to the tyre circumferential direction is gradually increased as it goes toward an outer side in a tyre axial direction.

19. The tyre according to claim 1, wherein
the tread portion includes a shoulder rib positioned closest to a tread edge, and
the shoulder rib is not provided with a groove or a sipe.

* * * * *